US010266694B2

(12) United States Patent
Via et al.

(10) Patent No.: US 10,266,694 B2
(45) Date of Patent: Apr. 23, 2019

(54) USE OF SOY FLOUR IN RESIN FORMULATIONS USED TO MANUFACTURE ENGINEERED WOOD COMPOSITES

(71) Applicant: Auburn University, Auburn, AL (US)

(72) Inventors: Brian Via, Opelika, AL (US); William G. Hand, Auburn, AL (US); Sujit Banerjee, Marietta, GA (US)

(73) Assignee: Auburn University, Auburn, AL (US)

( * ) Notice: Subject to any disclaimer, the term of this patent is extended or adjusted under 35 U.S.C. 154(b) by 55 days.

(21) Appl. No.: 15/067,729

(22) Filed: Mar. 11, 2016

(65) Prior Publication Data

US 2016/0264781 A1    Sep. 15, 2016

Related U.S. Application Data

(60) Provisional application No. 62/278,537, filed on Jan. 14, 2016, provisional application No. 62/132,299, filed on Mar. 12, 2015.

(51) Int. Cl.
| | |
|---|---|
| *B27N 3/00* | (2006.01) |
| *C08L 97/02* | (2006.01) |
| *B27N 3/08* | (2006.01) |
| *B27N 3/02* | (2006.01) |

(52) U.S. Cl.
CPC ............... *C08L 97/02* (2013.01); *B27N 3/08* (2013.01); *B27N 3/002* (2013.01); *B27N 3/02* (2013.01)

(58) Field of Classification Search
None
See application file for complete search history.

(56) References Cited

U.S. PATENT DOCUMENTS

| | | | |
|---|---|---|---|
| 2,882,250 | A | 4/1959 | Baker et al. |
| 3,274,042 | A | 9/1966 | Gilboe et al. |
| 4,824,896 | A | 4/1989 | Clarke et al. |
| 6,518,387 | B2 | 2/2003 | Kuo et al. |
| 7,345,136 | B2 | 3/2008 | Wescott et al. |
| 7,416,598 | B2 | 8/2008 | Sun et al. |
| 7,803,855 | B2 | 9/2010 | Kintzley et al. |
| 2006/0231968 | A1* | 10/2006 | Cowan ............... B27N 3/002 264/109 |
| 2006/0234077 | A1 | 10/2006 | Breyer et al. |
| 2007/0020476 | A1 | 1/2007 | Kintzley et al. |
| 2009/0066614 | A1 | 3/2009 | Ishii et al. |
| 2010/0089287 | A1 | 4/2010 | Thames et al. |
| 2015/0086775 | A1 | 3/2015 | Allen et al. |

FOREIGN PATENT DOCUMENTS

| | | |
|---|---|---|
| WO | 2010065758 A2 | 6/2010 |
| WO | 2016141126 A1 | 9/2016 |

OTHER PUBLICATIONS

Dastidar et al., "A Soy Flour Based Thermoset Resin Without the Use of Any External Crosslinker," Green Chemistry, 15, 3243, published Sep. 2, 2013, www.rsc.org/greenchem, 9 pages.
Hettiarachchy et al., "Alkali-Modified Soy Protein With Improved Adhesive and Hydrophobic Properties," Department of Food Science, University of Arkansas & Dept. of Food and Science, Iowa State University; JAOCS, vol. 72, No. 12, published Sep. 10, 1995, 4 pages.
Hse et al., "Development of Formaldehyde-Based Wood Adhesives With Co-Reacted Phenol/Soybean Flour," Green Chemistry for Adhesives, Wood Adhesives, 2000, 7 pages.
Huang et al., "A New Soy Flour-Based Adhesive for Making Interior Type II Plywood," J Am Oil Chem Society (2008) 85:63-70, DOI 10.1007//s11746-007-1162-1, published Nov. 15, 2007, 8 pages.
Li et al., "Mechanical and Water Soaking Properties of Medium Density Fiberboard With Wood Fiber and Soybean Protein Adhesive," Bioresource Technology 100 (2009) 3556-3562, published Mar. 28, 2009, 7 pages.
Lorenz et al., "Soy Flour Adhesive Strength Compared With That of Purified Soy Proteins," Forest Products Journal (vol. 65, No. 1/2), Forest Products Society, 2015, 5 pages.
Lorenz et al., "Analysis of Soy Flour/Phenol-Formaldehyde Adhesives for Bonding Wood," Wood Adhesives 2005: Technical Forum (Poster) Session, Nov. 2-4, 2005, San Diego, CA, 7 pages.
Mo et al., "Physical Properties of Medium-Density Wheat Straw Particleboard Using Different Adhesives," Industrial Crops and Products 18 (2003) 47-53, www.elsevier.com/locatefindcrop, 7 pages.
Qi et al., "Soy Protein Adhesive Blends With Synthetic Latex on Wood Veneer," J Am Oil Chem Society (2011) 88:271-281, DOI 10.1007/s11746-010-16666-y, published Aug. 29, 2010, 11 pages.
Schwarzkopf, Matthew John, "Development and Evaluation of Oriented Strandboard Bonded With Soy-Based Formaldehyde-Free Adhesives," Thesis Statement, Apr. 8, 2009, Oregon State University, 90 pages.
Wescott et al., "Competitive Soybean Flour/Phenol-Formaldehyde Adhesives for Oriented Strandboard," 38th International Wood Composites Symposium, Apr. 6-8, 2004, 10 pages.
Yang et al., "Comparison of Protein-Based Adhesive Resins for Wood Composites," J Wood Sci (2006) 52:503-508, DOI 10.1007/S10086-006-0804-5, The Japan Wood Research Society 2006, 6 pages.

* cited by examiner

*Primary Examiner* — Ana L. Woodward
(74) *Attorney, Agent, or Firm* — McKee, Voorhees & Sease, PLC

(57) ABSTRACT

Methods are provided for formulating binders for wood comprising unmodified soy flour and synthetic adhesives. The soy-based formulations can be in either liquid or solid form and are prepared by mixing unmodified soy flour with the synthetic adhesive prior to application to the wood or by adding them sequentially to the wood. The present invention provides adequate bonding at reduced cost.

10 Claims, 5 Drawing Sheets

USE OF SOY FLOUR IN RESIN FORMULATIONS USED TO MANUFACTURE ENGINEERED WOOD COMPOSITES

CROSS-REFERENCE TO RELATED APPLICATIONS

This application claims the priority under 35 U.S.C. § 119 to U.S. Provisional Application No. 62/132,299, filed Mar. 12, 2015, and U.S. Provisional Application No. 62/278,537, filed Jan. 14, 2016. The entire contents of these provisional patent applications are hereby expressly incorporated herein by reference including, without limitation, the specification, claims, and abstract, as well as any figures, tables, or drawings thereof.

FIELD OF THE INVENTION

The present invention generally relates to the art of formulating binders for engineered wood products. In particular, the binder compositions include unmodified soy flour and a synthetic resin.

BACKGROUND OF THE INVENTION

Figure 1A:
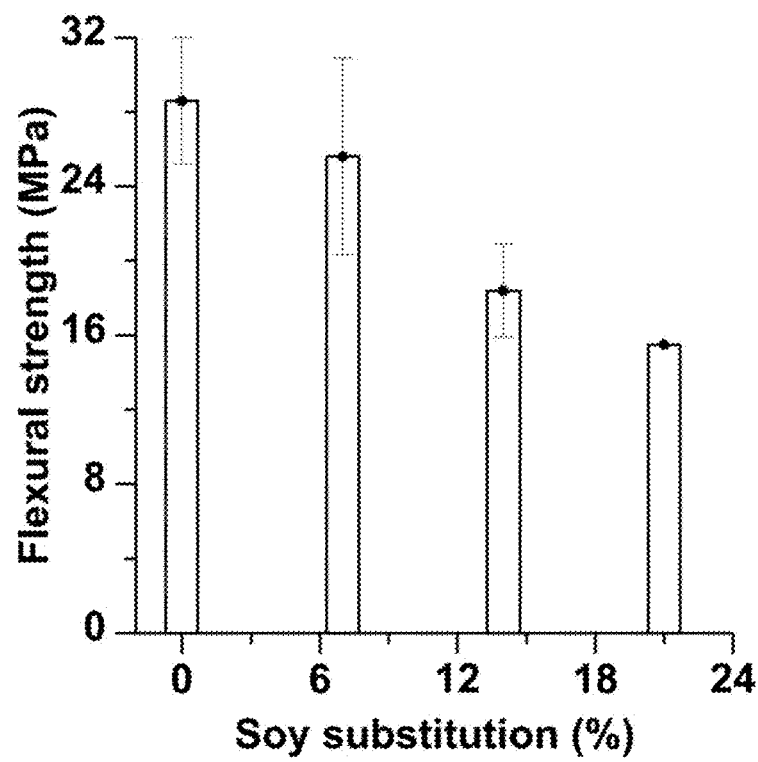
FIG. 1A shows the effect of PF resin substitution by unmodified soy flour in a liquid formulation on flexural strength.

Binders for bonding wood are used in the manufacture of engineered wood products such as oriented strand board (OSB), flake board, particleboard, veneer, and medium density fiberboard among other products. The cost of the binders is a very significant fraction of the cost of the process or product. Means to decrease the cost of the binder, e.g. by including less expensive components would reduce the cost of the wood product. Moreover, adhesive formulations comprising a combination of urea and formaldehyde structures or a combination of phenol and formaldehyde structures lead to the release of formaldehyde, a regulated chemical designated by the US National Toxicology Program as "known to be a human carcinogen." Reducing the UF and PF levels in their associated formulations by partially substituting a component that does not release formaldehyde would reduce toxic emissions from the wood product, which would be beneficial both in the manufacturing environment and, where applicable, to the quality of indoor air in contact with the wood product. Substituting synthetic resin with a cheaper alternative has been the subject of much research but generally unsuccessful from a cost:benefit basis as the engineered wood has lacked the desired functional properties. Accordingly, there is a need for a relatively inexpensive component or components that are compatible with existing binder formulation and which can be mixed therein to reduce the cost of the overall formulation and can also reduce formaldehyde emissions during the manufacture and use of the product board.

Attempts have been made to use alternative adhesives for binder compositions. For example, animal based materials, milk-based proteins, and certain types vegetable protein have been used for binder compositions. However, such products have lacked the desired product features, including, durability, water resistance, and strength. Distinctions exist with respect to the vegetable proteins previously used as they have required the modification of vegetable protein by copolymerizing the protein.

This disclosure reveals an unexpected and very useful finding whereby the partial substitution of synthetic resin by unmodified soy flour introduces the cost of the overall resin formulation while reducing toxic emissions and maintaining desired product properties.

BRIEF SUMMARY OF THE INVENTION

Engineered wood products and methods of preparing the same are provided herein according to the invention. Embodiments of the engineered wood products include lignocellulosic material and a binder composition, wherein the binder composition comprises unmodified soy flour and a synthetic resin.

The engineered wood products of the invention can be prepared by mixing a binder composition with lignocellulosic material to form a mixture, forming the mixture into a mat, and pressing the mat while simultaneously heating the mat to form a pressed wood composite. The binder material includes unmodified soy flour and synthetic resin.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

DESCRIPTION OF PREFERRED EMBODIMENTS

The present invention relates to engineered wood products, including in particular binders for the engineered wood products. The invention also relates to methods of making the engineered wood products. The methods and engineered wood products have many advantages over existing engineered wood products and their methods of manufacture. For example, the methods of the present invention do not require the use of common binders that are both expensive and subject to regulations due to toxicity.

The embodiments of this invention are not limited to particular engineered wood products or uses for the engineered wood products, which can vary and are understood by skilled artisans. It is further to be understood that all terminology used herein is for the purpose of describing particular embodiments only, and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in its SI accepted form.

Numeric ranges recited within the specification are inclusive of the numbers defining the range and include each integer and fraction within the defined range. Throughout this disclosure, various aspects of this invention are presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2¼, 3, 4½, 5, and 6. This applies regardless of the breadth of the range.

Definitions

So that the present invention may be more readily understood, certain terms are first defined. Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments of the present invention without undue experimentation, the preferred materials and methods are described herein. In describing and claiming the embodiments of the present invention, the following terminology will be used in accordance with the definitions set out below.

The term "about," as used herein, refers to variation in the numerical quantity that can occur, for example, through typical measuring and liquid handling procedures used for making concentrates or use solutions in the real world; through inadvertent error in these procedures; through differences in the manufacture, source, or purity of the ingredients used to make the compositions or carry out the methods; and the like. The term "about" also encompasses amounts that differ due to different equilibrium conditions for a composition resulting from a particular initial mixture. Whether or not modified by the term "about", the claims include equivalents to the quantities.

The terms "engineered wood product," "wood-containing composite," and "pressed wood composition," refer to wood-containing materials, including, but not limited to, chipboard, fiber board, flake board, laminated-strand lumber, oriented strand board (OSB), parallel-strand lumber, particle board, plywood, veneer, and wafer board. The term "fiber board" includes fiber board of any density, including, but not limited to medium density fiberboard and high density fiberboard.

The term "lignocellulosic material" as used herein refers to pieces of wood used to make engineered wood products and includes, but is not limited to, wood strands, wood particles, wood plies, wood fibers, and wood chips.

The term "MDI" is defined as resins prepared from methylene diphenyl di-isocyanate.

The term "PF" is defined as resins prepared from phenol and formaldehyde components.

The term "synthetic resin" is defined herein as a resin of non-biological origin prepared by polymerization of monomers of synthetic, typically hydrocarbon-based, monomers. Examples are PF, UF and MDI.

The term "UF" is defined as resins prepared from urea and formaldehyde components.

The term "unmodified soy flour" describes soy flour that has not been modified by functionalization, polymerization, copolymerization, cross-linking, or otherwise derivatized.

Binder Compositions

The binder compositions of the invention include unmodified soy flour and a synthetic resin. The binder compositions can optionally include other functional ingredients such as a dye, a pigment, a processing aid, a filler, an oil, a viscosity-modifying agent, and water.

The binder compositions can be prepared as a premix or mixed together with the other components of the wood-containing composite. For example, in some embodiments of the invention the ingredients of the binder compositions can be mixed directly together with other components of the wood-containing composite. Any of the ingredients in the binder composition can be prepared as a premix. For example, in some embodiments of the invention, the unmodified soy flour and synthetic resin can be mixed together to form a premix. In some embodiments the unmodified soy flour, synthetic resin, and optional functional ingredients can be mixed together as a premix. The binder compositions, including, but not limited to the premix, can be in powder form, liquid form, slurry form, or gel form.

The soy flour can comprise between about 1 wt. % and about 80 wt. % of the binder composition. In a preferred liquid embodiment of the binder composition, the soy flour comprises between about 1 wt. % and about 50 wt. % of the liquid binder composition, more preferably between about 5 wt. % and about 20 wt. %. In a preferred powder embodiment of the binder composition, the soy flour comprises between about 1 wt. % and about 80 wt. % of the binder composition, more preferably between about 10 wt. % and about 50 wt. %. The synthetic resin can be any suitable synthetic resin, including, for example, PF, UF, and MDI. The synthetic resin can comprise from about 20 wt. % to about 99 wt. % of the adhesive solids in the binder composition. In a preferred liquid embodiment of the binder composition, the synthetic comprises between about 50 wt. % and about 99 wt. % of the liquid binder composition, more preferably between about 80 wt. % and about 95 wt. %. In a preferred powder embodiment of the binder composition, the synthetic comprises between about 20 wt. % and about 99 wt. % of the adhesive solids in the binder composition, more preferably between about 50 wt. % and about 90 wt. % of the adhesive solids in the binder composition.

The optional functional ingredients can be added in an amount sufficient to provide the desired functional property, e.g., color or viscosity. Generally, the optional functional ingredients can be added in an amount between about 0 wt. % and about 30 wt. % of the binder compositions, preferably between about 0.01 wt. % and about 20 wt. %.

Methods of Preparing Engineered Wood Products

Engineered wood is manufactured by pressing wood components, e.g. in the form of sheets, flakes or fiber with an adhesive to form a composite structure used in building materials, furniture and other applications. For example, one of these products is OSB, which is manufactured from heat-cured adhesives and rectangular-shaped wood strands that are arranged in cross-oriented layers and pressed. The adhesive can be a major component.

Methods have been developed for formulating binders that comprise a mixture of conventional binders known in the art as PF, UF and MDI with unmodified soy flour. Advantageously, the soy-amended formulations are of lower cost than previous binders. Additionally, formaldehyde and other volatile compounds emitted from the bonded product during manufacturing and throughout its life cycle that are considered deleterious to human health as well as to the environment are reduced for the product manufactured with the soy-amended binder as compared to products manufactured with prior-art adhesive formulations.

The method of preparing the engineered wood products is influenced to a certain extent by the type of wood-containing composite being prepared, as each type of composite has varying processing settings and conditions. Generally, the method of preparing the engineered wood products comprises mixing the binder composition ingredients, including, at least the unmodified soy flour and synthetic resin, whether in liquid or solid form, applying the resulting mixture to lignocellulosic material, forming the mixture of binder and lignocellulosic materials into a mat, and pressing the mixture under heat to form an engineered wood product.

In some embodiments, the components of the binder composition can be separately mixed with the lignocellulosic material and subsequently combined to form the binder composition and lignocellulosic mixture. For example, the unmodified soy flour can be mixed with lignocellulosic material to form a mixture of unmodified soy flour and lignocellulosic material; and the synthetic resin can be mixed with lignocellulosic material to form a mixture of synthetic resin and lignocellulosic material. The binder composition can then be formed upon the combination of the mixture of synthetic resin and lignocellulosic material and the mixture of unmodified soy flour and lignocellulosic material.

In instances where the binder composition has a viscosity that is too high at room temperature to enable even-spreading of the formulation on the lignocellulosic materials, the binder composition can be heated to lower the viscosity to an appropriate level. In a preferred embodiment of the invention, the binder composition can be heated between about 25° C. and about 90° C. for between about 0.1 minutes to about 20 minutes prior to blending with the lignocellulosic material. In a more preferred embodiment of the invention, the binder composition can be heated between about 40° C. and about 60° C. for between about 5 minutes to about 15 minutes prior to blending with the lignocellulosic material.

The methods of the invention can employ any suitable density of the lignocellulosic materials. For example, the density can be between about 20 lbs/cubic feet and 60 lbs/cubic feet.

The methods of preparing the engineered wood products can be done in continuous method or in batch methods. Similarly, the methods of preparing the binder compositions can be done in a continuous process or in a batch process.

The following examples, which are merely illustrative of the present invention, demonstrate application of the present invention, as well as demonstrate the benefits associated therewith.

EXAMPLES

Embodiments of the present invention are further defined in the following non-limiting Examples. It should be understood that these Examples, while indicating certain embodiments of the invention, are given by way of illustration only. From the above discussion and these Examples, one skilled in the art can ascertain the essential characteristics of this invention, and without departing from the spirit and scope thereof, can make various changes and modifications of the embodiments of the invention to adapt it to various usages and conditions. Thus, various modifications of the embodiments of the invention, in addition to those shown and described herein, will be apparent to those skilled in the art from the foregoing description. Such modifications are also intended to fall within the scope of the appended claims.

Example 1

Formulating Unmodified Soy Flour With a Liquid PF Resin

In one preferred embodiment, unmodified soy flour (Bakers 7B from Archer Daniels Midland) was added to a liquid formulation containing PF at various substitutions. The resin comprising the mixture of unmodified soy flour and PF resin was blended with wood flakes, pressed into boards and representative elements of the boards subjected to strength tests. The formulation was prepared by mixing unmodified soy flour with liquid PF resin obtained as GP 240C11 RESI-STRAN until the mixture was uniform. Pine strands prepared for the manufacture of oriented strand board were dried at 100° C. for 4 hours. The dried strands were added to a bag with the formulated soy/PF resin and the bag shaken until the strands were coated with resin. The coated strands were transferred to a 21.0 mm×31.1 mm forming box and pressed between two metal plates such that the resulting panels were formed at a thickness of 11.1 mm. No wax was applied. The samples were loaded into the press with the temperature of both platens of the press maintained at 204° C. with a total pressing pressure of 2.0 MPa for 4 minutes. The boards were cut into 22.9 cm×3.8 cm strips (3 samples per board). Density was calculated according to ASTM D1037-12. The strips were tested on a Zwick/Roell Z010 Static Material Testing Machine with the longer strands facing downwards to ensure that maximum breaking force was achieved. The flexural strength and flexure modulus of the boards were measured with ASTM D1037-12 tests.

Figure 1B:
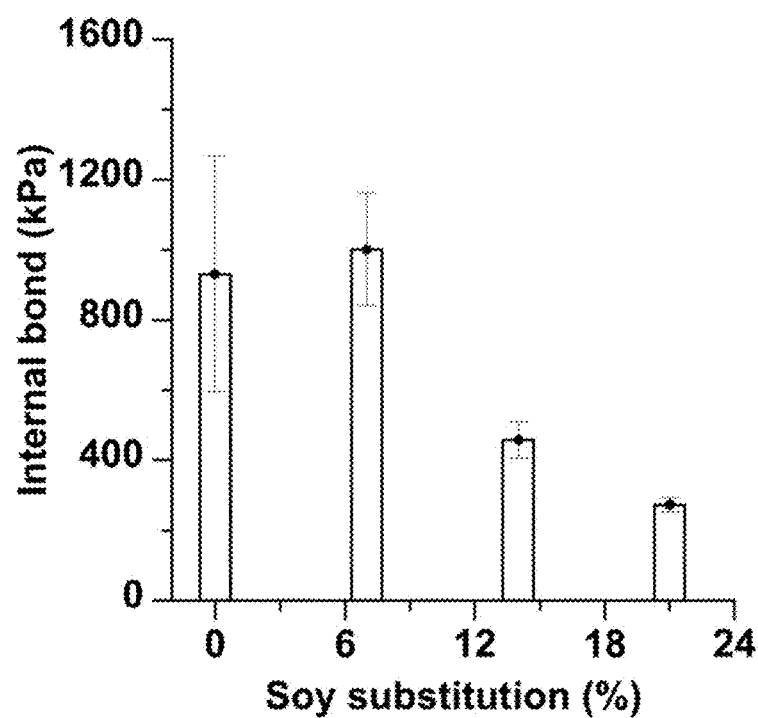
FIG. 1B shows the effect of PF resin substitution by unmodified soy flour in a liquid formulation on internal bond.

The effect of the soy-amended formulation on flexural strength and internal bond of boards prepared from pine flakes is illustrated in FIG. 1. The results for 6% substitution is statistically identical to the values for the control (0% soy flour substitution) demonstrating that at least 6% of the PF resin can be replaced by unmodified soy flour without incurring a statistically significant loss in flexural strength or in internal bond. This is an unexpected and very useful outcome because unmodified soy flour is of significantly lower cost than PF resin. Furthermore, formaldehyde is released from PF resin during the manufacturing process and also via degassing throughout its life cycle. Reduction of the PF level in the resin formulation leads to a concomitant reduction in formaldehyde emissions.

The use of binders based on soy protein isolates has been disclosed by Lorenz et al. (2015), Mo et al. (2003), Hettiarachchy et al. (1995), Qi et al (2011), Dastidar and Netravali (2013) and Li et al (2009). Soy isolates are components of soy flour, and their extraction from soy flour entails significant processing which adds to cost. As a result, the soy isolates are significantly more expensive than unmodified soy flour. The teachings of the present invention are patentably different from these prior art disclosures because unmodified soy flour is used, and the expensive step of isolating soy isolates from soy flour is avoided.

The use of soy flour cross-linked with PF resin has been disclosed in several applications, e.g. by Yang et al. (2006), Lorenz et al (2005), Hse and Lin (2005), Kuo et al (2003), Schwarzkopf (2010) and Huang (2008). Zhang et al. (2014) have disclosed binder formulations containing soy flour in combination with cross-linking agents such as triethanolamine. Resin formulations that include soy flour that is pre-hydrolyzed, cross-linked and otherwise derivatized have been reported. The use of soy flour cross-linked to PF resin or its precursors has been disclosed by Yang et al (2006), Wescott and Frihart (2004), and Lorenz et al (2005). The use of pre-hydrolyzed soy flour in combination with other components has been disclosed by Hse et al. (2000), Huang and Li (2008) and Wescott and Frihart (U.S. Pat. No. 7,345,136). Wescott and Frihart (Canadian patent 2,658,262) have disclosed the art of denaturing soy flour with urea and combining the denatured product with other components for use as a binder. The teachings of the present invention are patentably different from these prior art disclosures because unmodified soy flour is combined directly with synthetic resin without need for expensive pre-application treatments such as crosslinking with other agents.

Example 2

Formulating Unmodified Soy Flour With Powdered PF Resin

In another preferred embodiment, PF resin in powdered form is substituted by unmodified soy flour at 21% by weight. The powder resin was GP 190080 Woodweld. The unmodified soy flour and the powder resin were first shaken in a bag and the mixture then blended with the flakes following the procedure described in Example 1. The remaining steps of forming the flakes, pressing the mat into a board and testing the board followed the protocol described in Example 1. The effect of the soy-amended formulation on various bond properties of boards prepared from pine flakes is illustrated in TABLE 1. The properties of wet boards were obtained after soaking the boards in water for 24 hours. No statistically significant loss of properties is incurred with unmodified soy flour substitution.

TABLE 1

|  | PF only | 21% soy substitution |
| --- | --- | --- |
| Dry Internal bond (MPa) | 0.31 ± 0.09 | 0.28 ± 0.05 |
| Wet Internal bond (MPa) | 0.009 ± 0.002 | 0.005 ± 0.002 |
| Moisture absorption (%) | 44 ± 3 | 45 ± 1 |
| Thickness swell (%) | 53 ± 6 | 52 ± 7 |
| Modulus of rupture (MPa) | 26 ± 4 | 27 ± 7 |
| Modulus of elasticity (MPa) | 4,000 ± 500 | 4,300 ± 500 |

Example 3

Producing Board With Flakes Treated Separately With PF Resin and Unmodified Soy Flour In another preferred embodiment, unmodified soy flour is blended first with wood flakes, following which powder PF resin is blended with the soy-treated wood flakes. The flakes are then pressed into boards and representative elements of the boards subjected to strength tests. The procedure for forming the flakes, pressing the mat into a board and testing the board followed the protocol described in Example 1. The effect of the soy-amended formulation on flexural strength and internal bond of boards prepared from pine flakes is illustrated in TABLE 2. No statistical loss of strength properties is incurred at levels of unmodified soy flour substitution of up to 25%.

TABLE 2

|  | PF only | 10% soy substitution |
| --- | --- | --- |
| Dry Internal bond (MPa) | 0.16 ± 0.02 | 0.15 ± 0.05 |
| Moisture absorption (%) | 108 ± 2 | 117 ± 2 |
| Thickness swell (%) | 55 ± 8 | 72 ± 4 |
| Modulus of rupture (MPa) | 17 ± 7 | 15 ± 2 |
| Modulus of elasticity (MPa) | 2900 ± 1000 | 3300 ± 600 |

Example 4

Formulating Unmodified Soy Flour With MDI Resin

In another preferred embodiment, unmodified soy flour is added to a MDI resin at various substitutions. The MDI resin was MONDUR 541 from Bayer Material Science. The viscosity of the formulation of unmodified soy flour and MDI resin was high when the level of unmodified soy flour substitution was at 25% or a higher level. It is desirable to reduce the viscosity of the formulation to facilitate uniform blending with the flakes. The viscosity of formulations containing unmodified soy flour at 25% or more was reduced by heating the soy/MDI formulation to about 45° C. for ten minutes. Where the soy substitution was below 25% the soy/MDI formulation was applied without heating. Allen and Spraul (US patent application 20150086775) have disclosed a method of reducing the viscosity of soy-based liquid adhesive formulations by grinding the unmodified soy flour so that at least 70% of the unmodified soy flour particles have a particle size of less than 30 microns. The teachings of the present invention are patentably different from the Allen disclosure because the need for grinding is avoided. Grinding is associated with high capital and operating costs. Yang and Yang (U.S. Pat. No. 8,057,892) have disclosed a method of reducing the viscosity of an adhesive formulation by adding a viscosity modifier to the binder formulation. The teachings of the present invention are patentably different because the need for adding chemicals for viscosity modification is avoided.

The procedure for forming the flakes, pressing the mat into a board and testing the board followed the protocol described in Example 1. The effect of the soy-amended formulation on flexural strength and internal bond of boards prepared from pine flakes is illustrated in TABLE 3. No statistically significant loss of strength properties is incurred at levels of 20% unmodified soy flour substitution. A higher level of substitution can be accommodated if a small loss of strength can be tolerated in the interests of reducing cost.

TABLE 3

|  | MDI only | 20% soy substitution | 30% soy substitution |
| --- | --- | --- | --- |
| Dry Internal bond (MPa) | 0.38 ± 0.1 | 0.37 ± 0.08 | 0.17 ± 0.04 |
| Wet Internal bond (MPa) | 0.009 ± 0.002 | 0.05 ± 0.01 | 0.01 ± 0.007 |

TABLE 3-continued

| | MDI only | 20% soy substitution | 30% soy substitution |
|---|---|---|---|
| Moisture absorption (%) | 95 ± 9 | 82 ± 7 | 102 ± 810 |
| Thickness swell (%) | 53 ± 6 | 28 ± 7 | 61 ± 7 |
| Modulus of rupture (MPa) | 25 ± 5 | 42 ± 10 | 33 ± 8 |
| Modulus of elasticity (MPa) | 4000 ± 500 | 4800 ± 1000 | 4600 ± 1000 |

Without meaning to limit the scope and applicability of the invention in any way, it is believed that the unmodified soy flour is hydrolyzed during pressing of the wood product by the steam present in the wood mat produced by the action of the hot platens of the press on the water contained in the wood. The movement of steam through the mat is known to be responsible for the heat transfer from the platens to the wood. The intimate contact between the steam and unmodified soy flour is believed to lead to hydrolysis of the unmodified soy flour. The protein released during hydrolysis interacts with synthetic resin components and with wood tissue. The in-situ hydrolysis of unmodified soy flour in the wood mat under the conditions of temperature and time that occur during pressing is unexpected and is patentably different from the prior art. Significantly, in-situ hydrolysis does not incur the costs associated with pretreatment of unmodified soy flour.

Example 5

Flexural Strength and Modulus Studies

Figure 2:
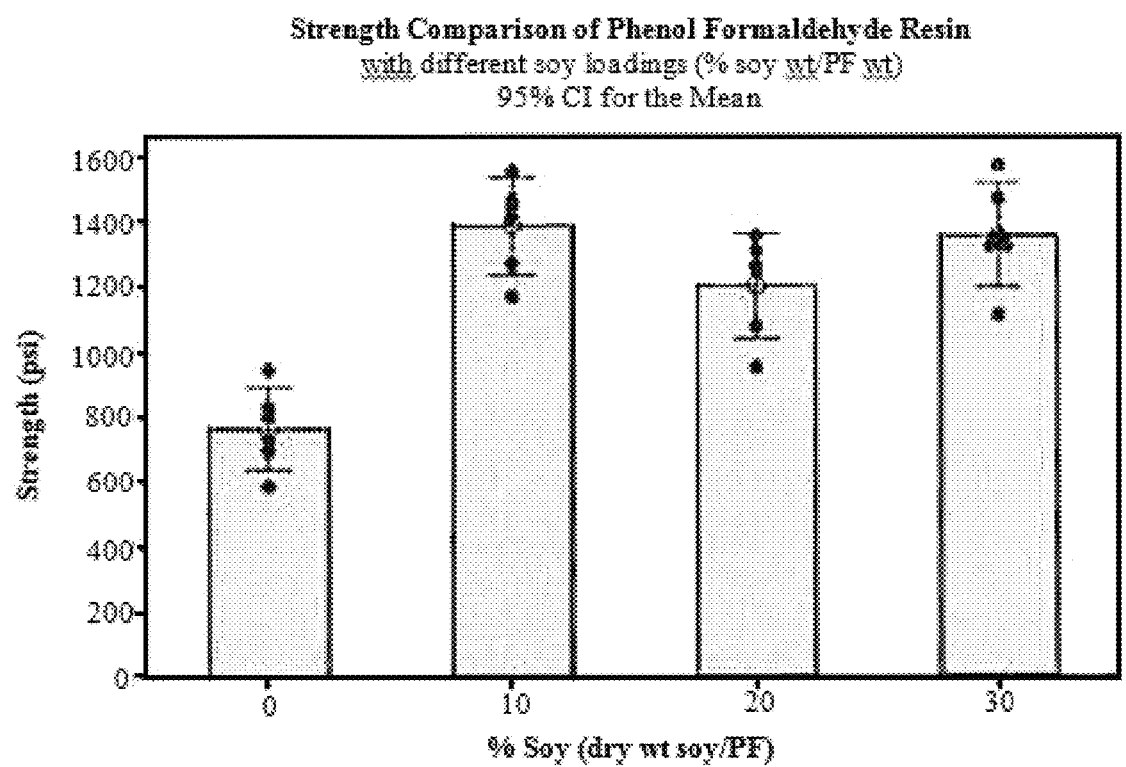
FIG. 2 shows a comparison of strength of varying levels of soy substitution with PF.

ProCote 4200 (a soy isolate from DuPont) was mixed with PF at substitutions of 10 wt. %, 20 wt. %, and 30 wt. %. The powdered soy was added to the PF along with water to achieve the same solids content as the PF control. Shear tests were run on loblolly pine lap samples according to standard DIN EN 205. The results are shown in FIG. 2. The soy significantly increased the strength of the PF resin.

Figure 3A:
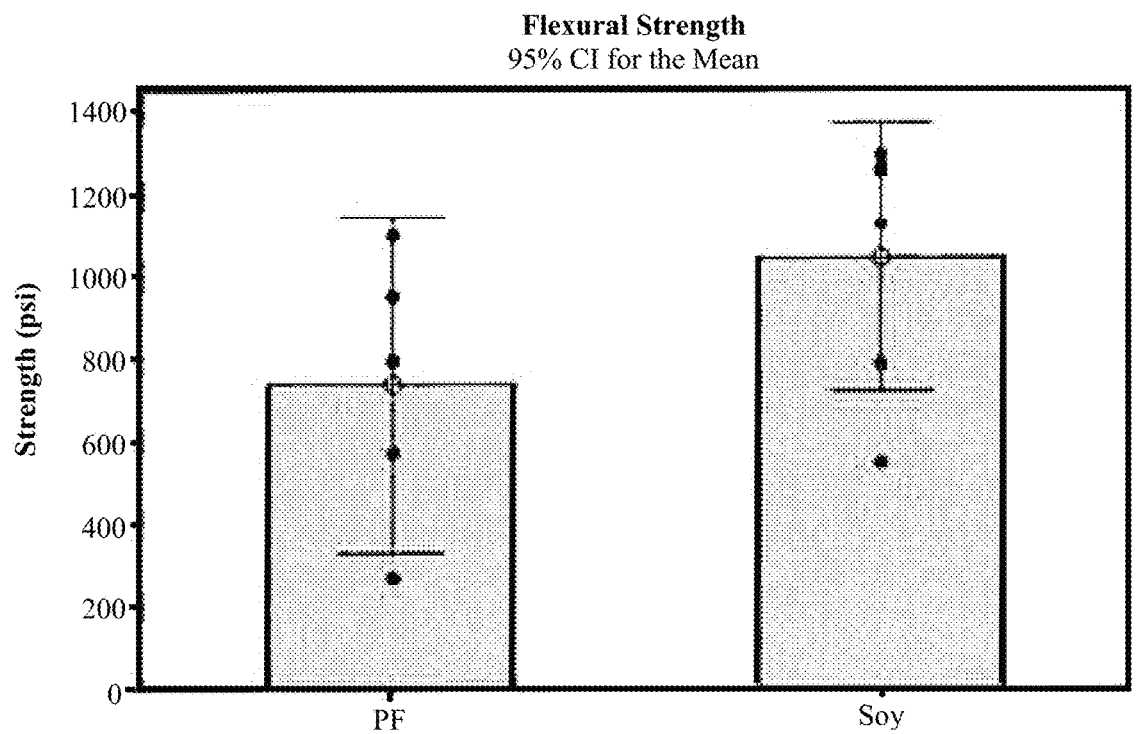
FIG. 3A shows a comparison of the flexural strength of PF versus 5% soy/PF as a shear coating on loblolly pine lap.
Figure 3B:
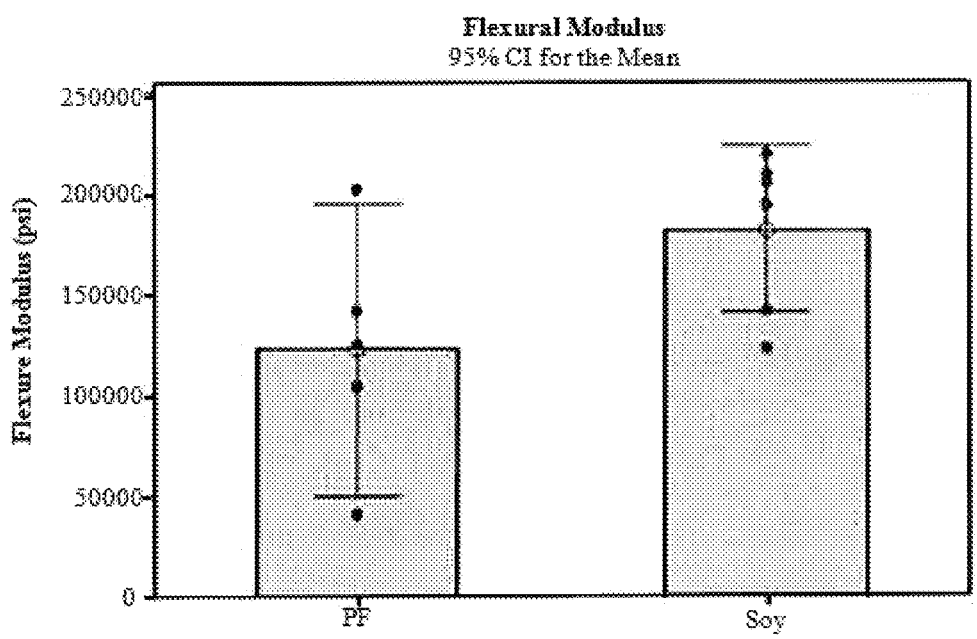
FIG. 3B shows a comparison of the flexural modulus of PF versus 5% soy/PF as a shear coating on loblolly pine lap.

Analogous measurements were made with 5% soy flour substitution of PF resin. Results for flexural strength and flexural modulus are shown in FIGS. 3A and 3B, respectively. The increase caused by the soy flour is statistically significant with p values of 0.08 and 0.05, respectively.

Figure 4A:
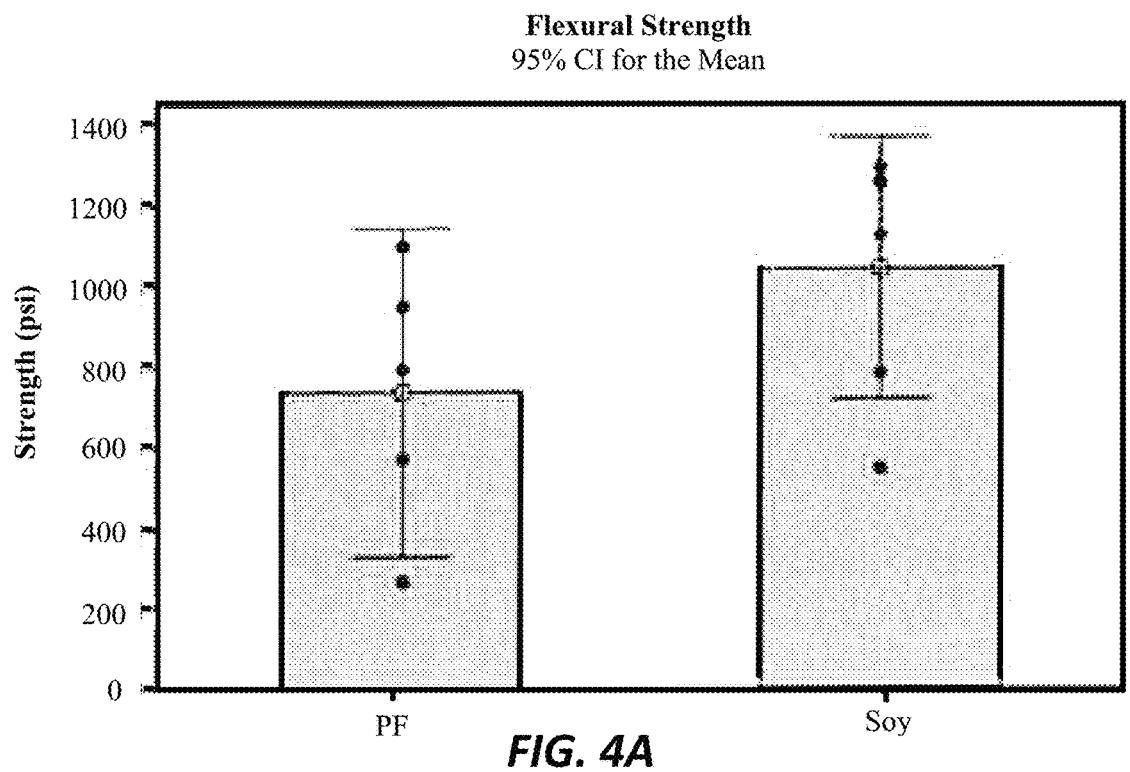
FIG. 4A shows a comparison of the flexural strength of PF versus 5% soy/PF as binder for OSB wood panels.
Figure 4B:
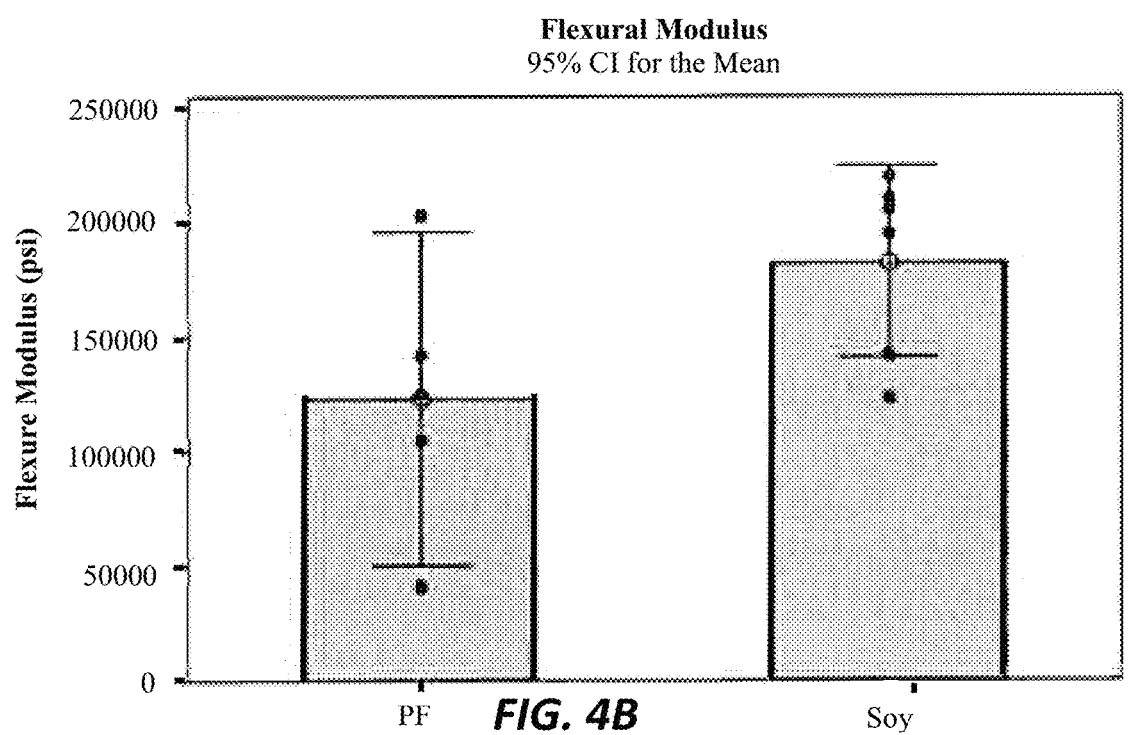
FIG. 4B shows a comparison of the flexural modulus of PF versus 5% soy/PF as binder for OSB wood panels.

The soy flour was also used to make OSB wood panels at a target density of 30 lbs/ft$^3$ and a thickness of $7/16$" for all boards. Four boards were formed: two controls of liquid PF and two with 5 wt. % soy and 95 wt. % PF. The strength and modulus were also normalized for density by dividing by the density. Results for flexural strength and flexural modulus are shown in FIGS. 4A and 4B, respectively. The 5% soy/PF board showed a higher strength (p value=0.07) and modulus (p value=0.05) than the PF control board.

Figure 5A:
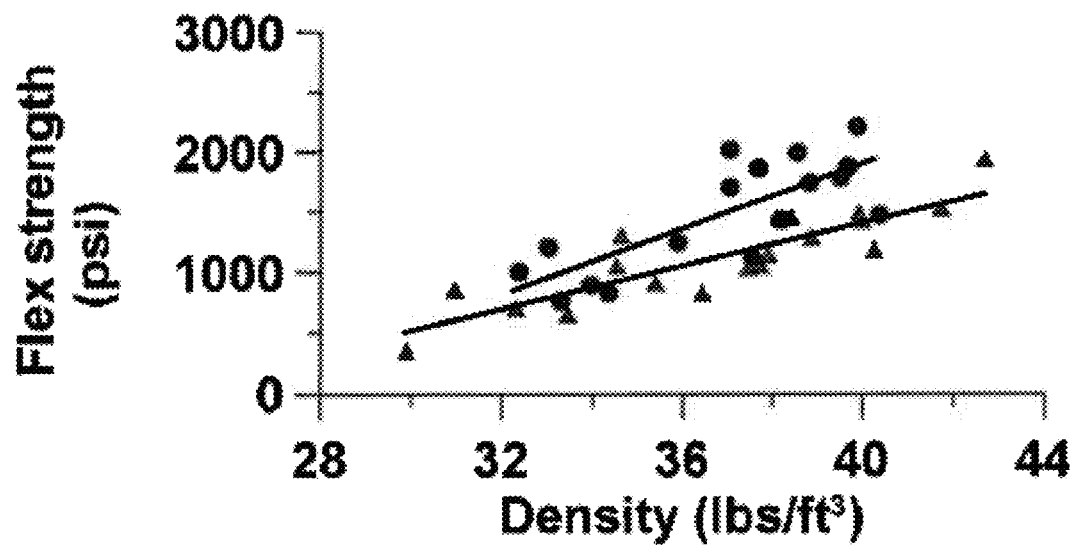
FIG. 5A shows a comparison of the flexural strength of OSB wood panels made with a PF and 5% soy/PF binder with a target density of 30 lbs/ft$^3$.
Figure 5B:
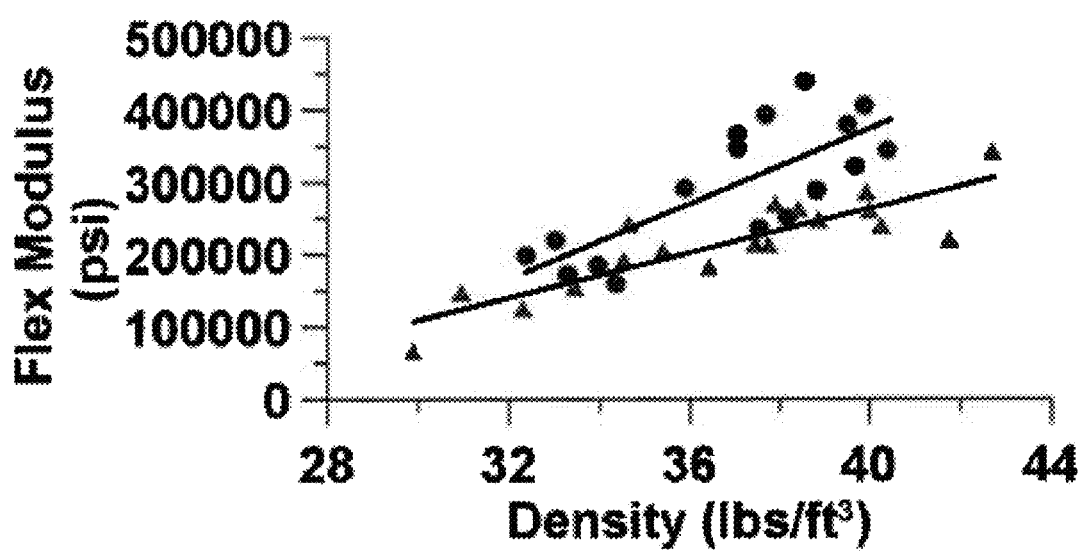
FIG. 5B shows a comparison of the flexural modulus of OSB wood panels made with a PF and 5% soy/PF binder with a target density of 30 lbs/ft$^3$.

The addition of soy flour at lower densities showed an equal performance in strength and stiffness when compared to the PF control at lower panel densities. Results for flexural strength and flexural modulus are shown in FIGS. 5A and 5B, respectively. In FIGS. 5A and 5B, the circle data points are of the PF control and the triangle data points are of the 5% soy substitution. This performance demonstrates that one can make panels of equivalent strength but at lower costs assuming soy flour costs are significantly lower than PF costs. The benefit of this is that manufacturers can make panels cheaper by adding soy but without a reduction in strength.

In summary, the above results clearly demonstrate that soy flour can be used to partially substitute PF in the resin without compromising or even improving the properties tested. The cost of the resin is, therefore, significantly reduced when compared to the base case where PF resin is used alone. While the application is exemplified by an application to OSB, it is noted that the approach can also be applied to plywood, strandboard, medium density fiberboard and other products where an adhesive is used to bond wood components. The approach can also be applied where fillers such as wood pulp and walnut shells are added along with the resin.

The inventions being thus described, it will be obvious that the same may be varied in many ways. Such variations are not to be regarded as a departure from the spirit and scope of the inventions and all such modifications are intended to be included within the scope of the following claims.

REFERENCES

A. J. Allen, B. K. Spraul, Soy-based adhesives with improved lower viscosity, US patent application 20150086775.

T. G. Dastidar, A. N. Netravali, A soy flour based thermoset resin without the use of any external crosslinker, Green Chem, 2013, 15, 3243-3251

N. S. Hettiarachchy, U. Kalapathy, D. J. Myers, Alkali-modified soy protein with improved adhesive and hydrophobic properties, J Am Oil Chem Soc, 72, 1461-1464, 1995.

C-Y. Hse, F. Fu, B. S. Bryant, Development of formaldehyde-based wood adhesives with co-reacted phenol/soybean flour, Wood Adhesives 13-19, 2000.

C. Y. Hse, L. Lin, Hydrolyzates of soybeans or other soy products as components of thermosetting resins. US patent 0272892A1, 2005.

J. Huang, K. Li, A new soy flour-based adhesive for making interior Type I plywood J Am Oil Chem Soc, 85 63-70, 2008.

M. Kuo, D. J. Meyers, H. Heemstra, D. Curry, D. O. Adams, D. D. Stokke, Soybean-based adhesive resins and composite products utilizing such adhesives, U.S. Pat. No. 6,518,387 B2, 2003.

X. Li, Y. Li, Zhong, D. Wang, J. A. Ratto, K. Sheng, S. X. Sun, Mechanical and water soaking properties of medium density fiberboard with wood fiber and soybean protein adhesive, Bioresource Tech, 100, 3556-3562, 2009.

L. F. Lorenz, M. Birkeland, C. Daurio, C. R. Frihart, Soy flour adhesive strength compared with that of purified soy proteins, Forest Prod. J., 65 (½) 26-30, 2015.

L. Lorenz, C. R. Frihart, J. M. Wescott, Analysis of soy flour/phenol-formaldehyde adhesives for bonding wood, Wood Adhesives, 501-505, 2005.

X. Mo, E. Cheng, D Wang, X. S. Sun, Physical properties of medium-density wheat straw particle board using different adhesives, Ind Crops and Prod, 18, 47-53, 2003

G. Qi, X. S. Sun, Soy protein adhesive blends with synthetic latex on wood veneer, J Am Oil Chem Soc, 88, 271-281, 2011.

M. J. Schwarzkopf, Development and evaluation of oriented strand board bonded with soy-based formaldehyde-free adhesives, MS thesis, Oregon State University, 2010.

J. M. Wescott, C. R. Frihart, Stable adhesives from urea-denatured soy flour, Canadian patent 2,658,262.

J. M. Wescott, C. R Frihart, Water-resistant vegetable protein adhesive dispersion compositions, U.S. Pat. No. 7,345,136.

J. M. Wescott, C. R. Frihart, Competitive soybean flour/phenol formaldehyde adhesives for oriented strandboard, 38$^{th}$ Intl Wood Composites Symp Pullman, Wash., 2004.

I. Yang, M. Kuo, D. J. Myers, Bond quality of soy-based phenolic adhesives in Southern Pine plywood, JAOCS, Vol. 83, 231-237, 2006.

G. Yang, B. Yang, Wood adhesive and method of preparing thereof, U.S. Pat. No. 8,057,892, US patent application 20100258033.

M. Zhang, P. F. Miele, J. Asrar, Formaldehyde-free protein-containing binder compositions, U.S. Pat. No. 8,809,477.

What is claimed is:

1. A method of preparing a pressed wood composite comprising:
   heating an admixed binder composition to between 30° C. and about 90° C., wherein the heating decreases the admixed binder composition's viscosity; then
   combining the admixed binder composition with lignocellulosic material to form a mixture, wherein the binder composition comprises unmodified soy flour and a synthetic resin, wherein the unmodified soy flour is in an amount between about 1 wt. % and up to about 50 wt. %;
   forming the mixture into a mat; and
   pressing the mat while simultaneously heating the mat to form a pressed wood composite.

2. The method of claim 1 wherein the pressed wood composite is a chipboard, medium density fiberboard, high density fiberboard, flake board, laminated-strand lumber, oriented strand board, parallel-strand lumber, particle board, plywood, veneer, or wafer board.

3. The method of claim 1 wherein the binder composition is a premix.

4. The method of claim 3 wherein the premix is a liquid comprising between about 1 wt. % and about 30 wt. % of the unmodified soy flour and between about 70 wt. % and about 99 wt. % of the synthetic resin.

5. The method of claim 4, wherein the unmodified soy flour comprises between about 2 wt. % and about 20 wt. % of the liquid premix.

6. The method of claim 3 wherein the premix is a powder premix comprising between about 2 wt. % and about 50 wt. % of the unmodified soy flour and between about 50 wt. % and about 98 wt. % of the synthetic resin.

7. The method of claim 6, wherein the unmodified soy flour comprises between about 10 wt. % and about 50 wt. % of the powder premix.

8. The method of claim 3, wherein the synthetic resin is methylene diphenyl di-isocyanate (MDI) resins, phenol and formaldehyde (PF) resins, and urea and formaldehyde (UF) resins.

9. The method of claim 1, wherein the binder composition is heated between about 35° C. and about 90° C. for between about 0.1 minutes to about 20 minutes prior to the combining step.

10. The method of claim 9, wherein the binder composition is heated to between about 40° C. and about 60° C. prior to the combining step.

* * * * *